Patented Feb. 11, 1930

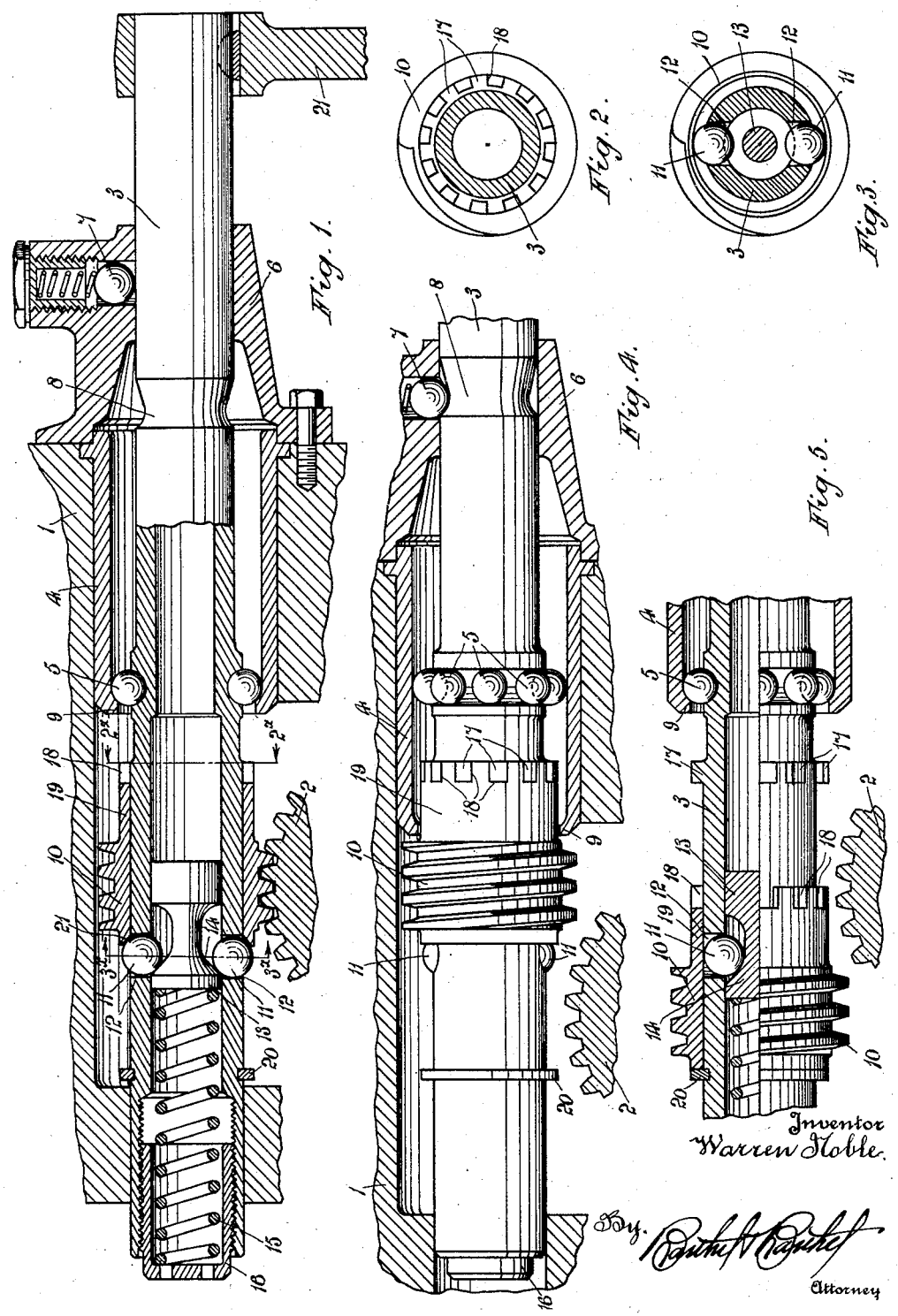

1,747,126

UNITED STATES PATENT OFFICE

WARREN NOBLE, OF DETROIT, MICHIGAN

ENGINE-CRANKING DEVICE

Application filed May 6, 1927. Serial No. 189,229.

This invention relates to cranking devices for the starting of internal combustion engines, wherein it is desirable that the cranking member may be normally disconnected from, but readily brought into connection with, a member to be cranked, and at the same time be capable of automatic disconnection therefrom in the event of back-firing of the engine.

It is, therefore, the principal object of this invention to provide a simple means establishing a gear connection between a cranking member and the crankshaft of an internal combustion engine, which means is capable of automatic disconnection if subjected to a force applied in one direction thereto.

It is further and more particularly an object of the invention to provide a cranking member having a cranking worm thereon with means yieldably supporting the said worm in an operative position from the cranking member, but adapted to release the worm and permit its sliding on the member out of engagement with the gear of the crankshaft in the event of the rotation of the said gear in other than its required direction.

Still further objects or advantages subsidiary or incidental to the aforesaid objects, or resulting from the construction or operation of the invention as it may be carried into effect, will become apparent as the said invention is hereinafter further disclosed.

In carrying the said invention into effect, I may provide a cranking shaft with means slidably supporting it transversely of the axis of an engine crankshaft, said shaft having a worm slidable thereon between stops and adapted to engage a complementary worm gear mounted on the engine crankshaft, one of the said stops being in the form of abutments on the said shaft adapted to engage splines on the worm to establish a driving connection between said worm and the cranking shaft. Intermediate of these stops, and at the opposite end of the worm to its splines, are spring pressed balls carried by the cranking shaft and acting as yielding stops to retain the said worm, under normal conditions, in its splined connection with the said cranking shaft, whereby the worm and its supporting shaft are movable together as a unit in one direction from the gear of the crankshaft, and the worm is movable independently on its shaft in the other direction against the resistance of the said yielding stops.

All of which is more particularly described and ascertained hereinafter, by way of example, having reference to the accompanying drawing, wherein:

Figure 1 is a fragmentary section of an engine showing in detail and mainly in section the improved cranking means applied thereto, the said means being shown in an operative or cranking position;

Figure 2 is transverse section through the cranking device, said section being taken on the line 2x—2x of Figure 1;

Figure 3 is a further section on the line 3x—3x of Figure 1;

Figure 4 is a similar view to Figure 1, showing the parts in an inoperative position, the cranking shaft and the worm mounted thereon being shown in elevation; and Figure 5 is a fragmentary detail sectional view of the cranking device, partly in section and partly in elevation, showing the parts in position which they acquire upon the backfiring of the engine.

Similar characters of reference indicate similar parts in the several figures of the drawing.

1 indicates part of an engine structure and 2 a worm gear mounted on the crankshaft (not shown) of the engine as will be well understood, this gear being for the purpose of enabling the said crankshaft to be rotated for starting the engine. Arranged transversely of and above the crankshaft axis is a tubular cranking member or shaft 3 journaled in the said structure 1, 4 being a ball cage in which the said member 3 is movable endwise on bearing balls 5.

Secured to the structure 1 is also a quill 6 surrounding the shaft 3 and housing a spring pressed ball or detent 7 which bears against the shaft and is adapted to engage in an annular groove 8 formed in the said shaft 3, when the shaft is moved outwardly of the structure 1 to a sufficient extent as indicated in Figure 4. The inward movement of the shaft is limited by an internal abutment 9 on the said ball race 4, which engages the balls 5 when they are moved with the shaft inwardly to an operative position of the shaft indicated in Figure 1.

10 is a worm sleeve slidably mounted on the said shaft 3, but normally held against sliding by balls 11 protruding from openings 12 in the tubular shaft under the influence of the spring pressed plunger 13 having a conical face 14 forcing the said balls outwardly of the hollow shaft 3 by virtue of the action of the spring 15 confined within the said shaft by the plug 16. The said sleeve is prevented from sliding along its shaft, to an extent which would permit an escape entirely of the balls 11 through the orifices 12, by splines or abutments 17 on the shaft, which abutments engage in corresponding splines or recesses 18 in the end of a tubular extension 19 of the said sleeve 10, the said sleeve being, therefore, normally held between the said abutments 17 and the balls 11 against sliding on the shaft 3.

The said sleeve is, however, capable of sliding along the shaft over the balls 11 in the event of sufficient force being applied to the sleeve in the direction of the said balls, to effect their depression into the shaft against the resistance of the spring pressed supporting plunger 13 which, in such event, is pressed in the direction of the spring 15 by virtue of the action of the balls on the conical face 14 of the said plunger as will be readily understood.

This sliding movement of the said sleeve 10 is limited by an annular stop 20 on the said shaft 3, and to facilitate the passing of the sleeve over the said balls, upon the application of the required pressure thereto, the ball engaging end of the sleeve is internally bevelled at 21 as shown. The said sliding movement of the sleeve 10, of course, results in the disengagement of the tubular extension 19 from the abutment 17 of the said shaft, so it is then also free to rotate on the shaft.

As heretofore stated, the inoperative position of the parts is that shown in Figure 4 wherein the shaft 3 is partially withdrawn from the structure 1 and held in such withdrawn position by the detent ball 7 engaging the annular recess 8 of the shaft. In this position the worm of the sleeve 10 is out of mesh with the gear 2, and may be brought into mesh therewith by pushing the shaft 3 inwardly of the structure 1 until the position of the parts shown in Figure 1 is assumed, when it will be apparent that by rotating the shaft 3, the crankshaft gear 2 may be operated by the said worm of the sleeve 10 due to the splined engagement thereof with the said shaft 3.

The parts are designed for clockwise operation of the shaft 3, which will result in clockwise operation of the gear 2 for engine starting, but if said crankshaft gear 2 rotates in anti-clockwise direction, as in the case of the engine back-firing, then it will simply slide the sleeve 10 over the balls 11, overcoming their resistance to such movement, so that the said sleeve may then assume the position shown in Figure 5 out of mesh with the said gear 2 thereby preventing anti-clockwise rotation of the shaft 3.

This affords a very simple safeguard to the operator against injury upon the back-firing of the engine, or against injury to any mechanisms which may be connected with the shaft 3 for any purpose and which it is desirable should not be rotated or operated except in one direction.

21 represents part of a suitable hand crank for effecting the rotation of the said shaft 3.

This invention may be developed within the scope of the following claims without departing from the essential features of the said invention, and it is desired that the specification and drawing be read as being merely illustrative and not in a limiting sense, except as necessitated by the prior art.

What I claim is:—

1. In combination with the crankshaft of an engine, cranking means comprising a worm gear on said crankshaft, a starting shaft slidable longitudinally over said gear, a worm on said shaft, said worm being movable with said shaft in one direction out of engagement with said gear, and resilient locking means holding said worm against sliding on said shaft in an opposite direction.

2. In combination with the crankshaft of an engine, cranking means comprising a worm gear on said crankshaft, a starting shaft slidable longitudinally over said gear, a worm on said shaft, means locking said worm operatively at one end to said shaft, said worm being slidable out of locked engagement with said shaft in a direction opposite to its locked end, and yieldable locking means resisting the sliding movement of said worm on said shaft.

3. In combination with the crankshaft of an engine, cranking means comprising a worm gear on said crankshaft, a starting shaft slidable longitudinally over said gear, a worm normally locked to said shaft and movable with said shaft out of engagement with said gear in a direction of normal gear rotation, said worm being slidable on said shaft in an opposite direction, and frictional means yieldably resisting the sliding of said worm on said shaft.

4. In combination with the crankshaft of an engine, cranking means comprising a worm gear on said crankshaft, a starting shaft slidable longitudinally over said gear, a worm normally locked to said shaft and movable with said shaft out of engagement with said gear in a direction of normal gear rotation, said worm being slidable on said shaft out of engagement therewith in an opposite direction, and means yieldably resisting the sliding of said worm on said shaft, said means resisting to a substantially less extent any movement of the worm gear to a new position after yielding to any movement thereof.

5. In combination with the crankshaft of an engine, cranking means comprising a worm gear on said crankshaft, a starting shaft slidable longitudinally over said gear, a worm on said shaft, means normally locking said worm against rotation on said shaft, said worm being slidable on said shaft out of locked engagement therewith in a direction opposite to the normal rotation of said gear, and frictional means yieldably holding said worm in its position of locked engagement with said shaft, said worm gear by a slight movement overcoming said frictional means whereupon it may slide with reduced resistance.

6. In combination with the crankshaft of an engine, cranking means according to claim 5, wherein said last mentioned means are in the form of stops depressible into said shaft to permit the sliding of said worm thereon, and resilient means effecting the outward thrust of said stops.

In testimony whereof I affix my signature.

WARREN NOBLE.